United States Patent
Sato et al.

(10) Patent No.: US 10,896,014 B2
(45) Date of Patent: Jan. 19, 2021

(54) PRINT JOB TRANSMITTING APPARATUS, PRINT SYSTEM

(71) Applicant: KYOCERA Document Solutions Inc., Osaka (JP)

(72) Inventors: Masafumi Sato, Osaka (JP); Tatsuya Hiwatari, Osaka (JP); Keiji Tsuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/567,600

(22) Filed: Sep. 11, 2019

(65) Prior Publication Data

US 2020/0089450 A1    Mar. 19, 2020

(30) Foreign Application Priority Data

Sep. 13, 2018 (JP) .................................. 2018-171567

(51) Int. Cl.
 *H04N 1/32* (2006.01)
 *H04N 21/20* (2011.01)
 *H04N 21/239* (2011.01)
 *H04N 21/24* (2011.01)
 *G06F 3/12* (2006.01)

(52) U.S. Cl.
 CPC .......... *G06F 3/1263* (2013.01); *G06F 3/1204* (2013.01); *G06F 3/1241* (2013.01); *G06F 3/1286* (2013.01); *G06F 3/1287* (2013.01)

(58) Field of Classification Search
 USPC .......... 358/1.1–3.29, 1.11–1.18; 399/75–82; 710/28–44
 See application file for complete search history.

(56) References Cited

U.S. PATENT DOCUMENTS

| | | | |
|---|---|---|---|
| 9,019,523 B2* | 4/2015 | Itogawa | H04N 1/00244 358/1.14 |
| 2002/0143915 A1* | 10/2002 | Mathieson | G06F 9/5027 709/223 |
| 2012/0069394 A1* | 3/2012 | Ono | G06F 3/1267 358/1.15 |
| 2017/0277494 A1* | 9/2017 | Sun | G06F 3/1203 |
| 2018/0173473 A1* | 6/2018 | Lankreijer | G06F 9/5011 |

FOREIGN PATENT DOCUMENTS

JP         2012022452 A    2/2012

* cited by examiner

*Primary Examiner* — Marcellus J Augustin
(74) *Attorney, Agent, or Firm* — Alleman Hall Creasman & Tuttle LLP

(57) ABSTRACT

In a print job transmitting apparatus, when the print job transmitting apparatus is communicably connected with a server configured to spool a print job, a transmission destination confirming portion prioritizes the server over an image forming apparatus and confirms the server as a transmission destination of the print job. When the print job transmitting apparatus is not communicably connected with the server and is communicably connected with the image forming apparatus, the transmission destination confirming portion confirms the image forming apparatus as the transmission destination, and even in a case where the print job transmitting apparatus is communicably connected with the server, when a size of the print job is greater than or equal to a specific size, the transmission destination confirming portion confirms the image forming apparatus as the transmission destination.

2 Claims, 8 Drawing Sheets

PRINT JOB TRANSMITTING APPARATUS, PRINT SYSTEM

INCORPORATION BY REFERENCE

This application is based upon and claims the benefit of priority from the corresponding Japanese Patent Application No. 2018-171567 filed on Sep. 13, 2018, the entire contents of which are incorporated herein by reference.

BACKGROUND

The present disclosure relates to a print job transmitting apparatus for transmitting a print job, and a print system including the print job transmitting apparatus.

Conventionally, there is known a print system including an image forming apparatus for executing a print job, a server, and a print job transmitting apparatus. The server spools the print job to be executed by the image forming apparatus. The print job transmitting apparatus transmits the print job to the server.

SUMMARY

A print job transmitting apparatus according to an aspect of the present disclosure includes a transmission destination confirming portion and a job transmission portion. The transmission destination confirming portion confirms a transmission destination of a print job. The job transmission portion transmits the print job to the transmission destination that has been confirmed by the transmission destination confirming portion. When the print job transmitting apparatus is communicably connected with a server configured to spool the print job to be executed by an image forming apparatus, the transmission destination confirming portion prioritizes the server over the image forming apparatus and confirms the server as the transmission destination, and when the print job transmitting apparatus is not communicably connected with the server and is communicably connected with the image forming apparatus, the transmission destination confirming portion confirms the image forming apparatus as the transmission destination. Furthermore, even in a case where the print job transmitting apparatus is communicably connected with the server, when a size of the print job is greater than or equal to a specific size, the transmission destination confirming portion confirms the image forming apparatus, instead of the server, as the transmission destination.

A print system according to another aspect of the present disclosure includes the print job transmitting apparatus, the image forming apparatus for executing the print job, and the server for spooling the print job to be executed by the image forming apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings.

First, a configuration of a print system according to an embodiment of the present disclosure is described.

Figure 1:
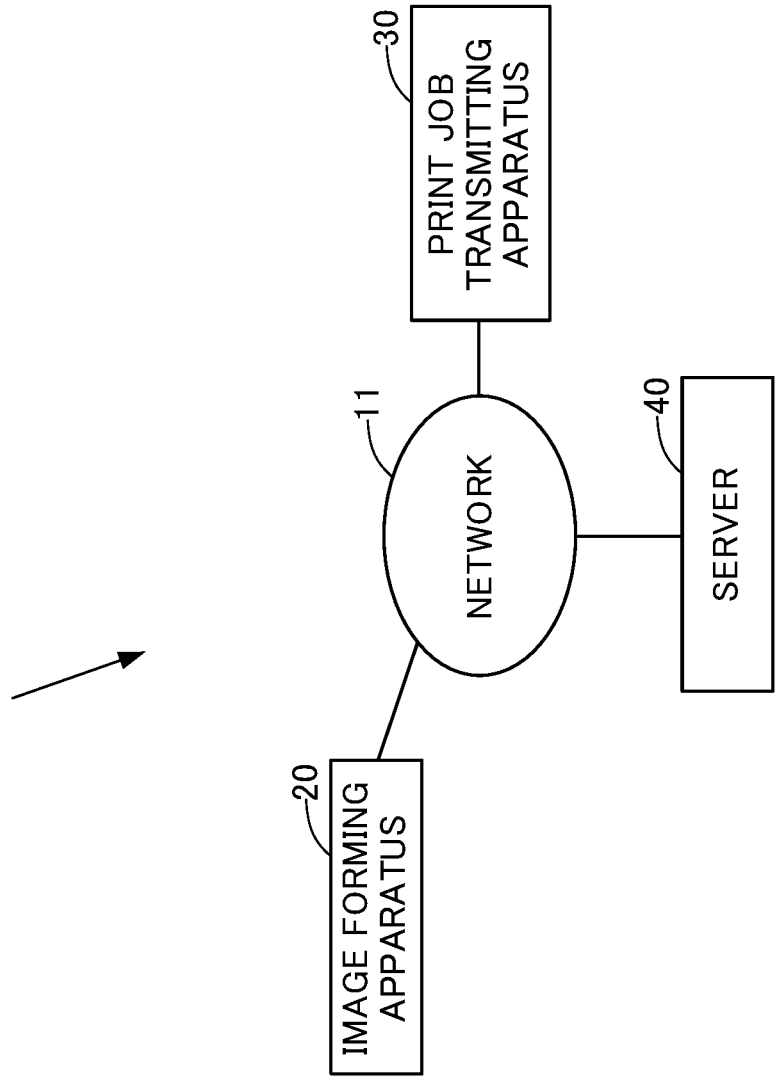
FIG. 1 is a block diagram of a print system according to an embodiment of the present disclosure.

FIG. 1 is a block diagram showing a print system 10 according to the embodiment of the present disclosure.

The print system 10 includes one or more image forming apparatuses 20. FIG. 1 shows an example of the print system 10 including one image forming apparatus 20. The print system 10 may include multiple image forming apparatuses 20. The image forming apparatus 20 is configured by, for example, an MFP (multifunction peripheral) or a machine that is exclusively for printing.

The print system 10 includes one or more print job transmitting apparatuses 30. The print job transmitting apparatus 30 is configured to transmit a print job to the image forming apparatus 20 of the print system 10. FIG. 1 shows an example of the print system 10 including one print job transmitting apparatus 30. The print system 10 may include multiple print job transmitting apparatuses 30. The print job transmitting apparatus 30 is configured by, for example, a computer such as a PC (personal computer).

The print system 10 includes a server 40 for managing information relating to the image forming apparatus 20 of the print system 10. The server 40 may be configured by one or more computers.

The image forming apparatus 20 of the print system 10, the print job transmitting apparatus 30 of the print system 10, and the server 40 communicate with one another via a network 11 such as a LAN (local area network).

Figure 2:
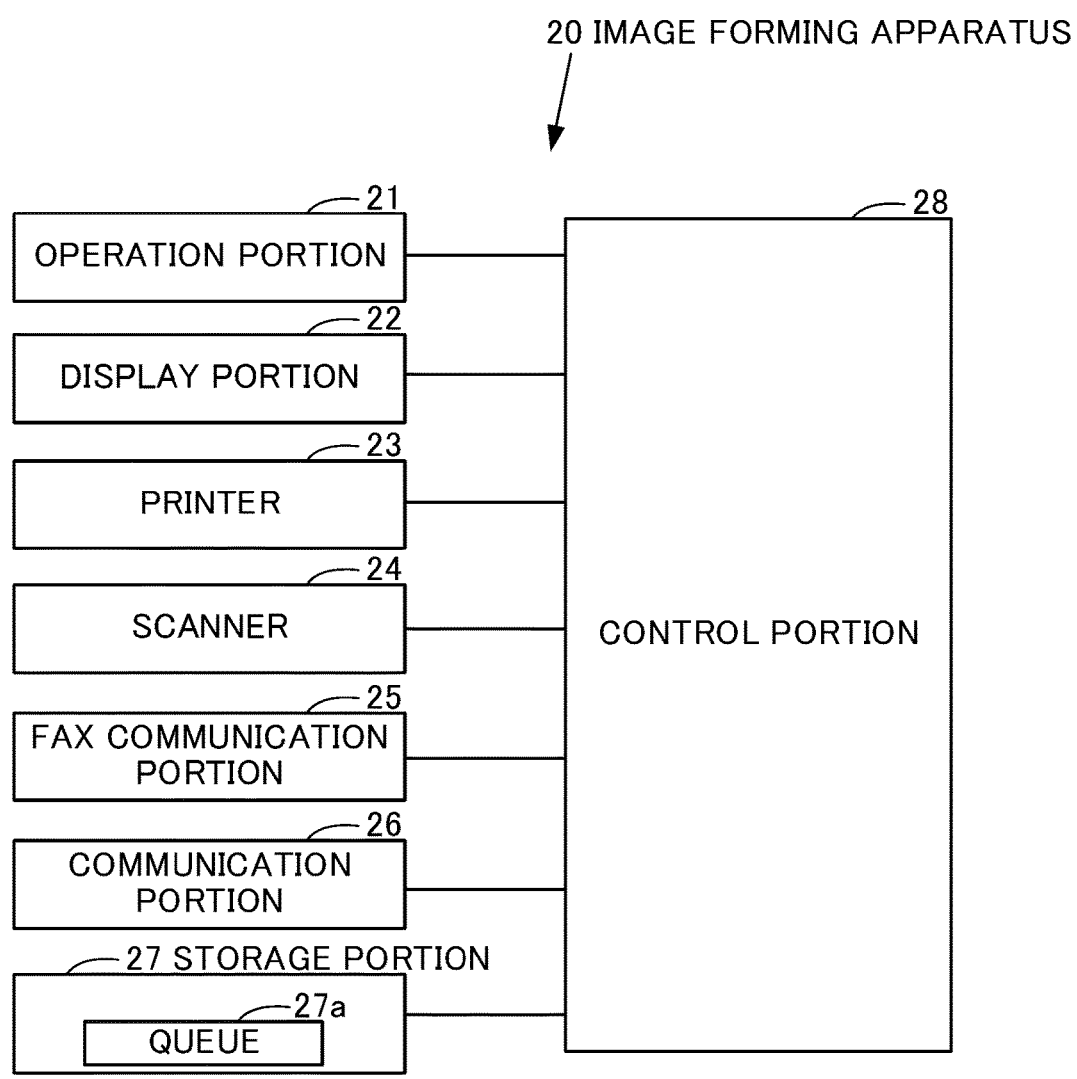
FIG. 2 is a block diagram of an image forming apparatus shown in FIG. 1, in a case where the image forming apparatus is an MFP.

FIG. 2 is a block diagram showing a case where the image forming apparatus 20 is an MFP.

The image forming apparatus 20 in FIG. 2 includes an operation portion 21, a display portion 22, a printer 23, a scanner 24, a fax communication portion 25, a communication portion 26, a storage portion 27, and a control portion 28.

The operation portion 21 is an operation device such as a set of buttons for inputting various operations. The display portion 22 is a display device such as an LCD (liquid crystal display) for displaying various types of information.

The printer 23 is a printing device for printing an image on a recording medium such as a sheet of paper. The scanner 24 is a reading device for reading an image from a document sheet.

The fax communication portion 25 is a fax device for performing fax communication, with an external facsimile device (not shown), via a communication line such as a dial-up line (not shown).

The communication portion 26 is a communication device for communicating, with an external device, indirectly via the network 11 such as a LAN or the internet, or directly by wired or wireless communication that is not performed via the network 11. The control portion 28 is a device for integrally controlling the image forming apparatus 20.

The storage portion 27 is a non-volatile storage device such as a semiconductor memory or an HDD (hard disk drive) for storing various types of information. The storage portion 27 is stored with a queue 27a for spooling the print job.

The control portion 28 includes, for example, a first CPU (central processing unit), a first ROM (read only memory), and a first RAM (random access memory). The first ROM stores a program and various types of data. The first RAM is a memory used as a work area for the first CPU. The first CPU executes the program stored in the storage portion 27 or the first ROM.

Figure 3:
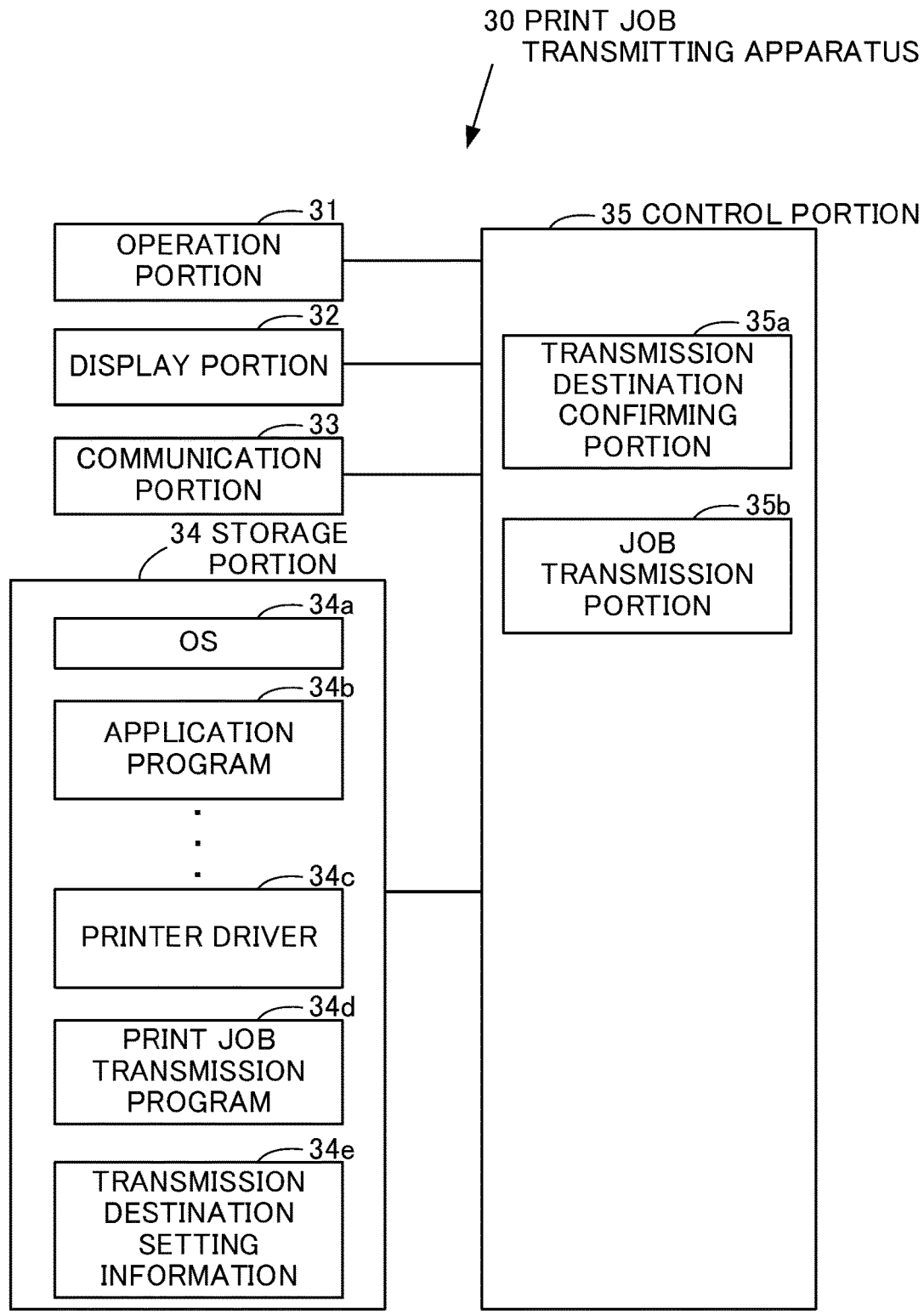
FIG. 3 is a block diagram of a print job transmitting apparatus shown in FIG. 1.

FIG. 3 is a block diagram showing the print job transmitting apparatus 30.

The print job transmitting apparatus 30 shown in FIG. 3 includes an operation portion 31, a display portion 32, a communication portion 33, a storage portion 34, and a control portion 35. The operation portion 31 is an operation device such as a keyboard or a mouse for inputting various types of information. The display portion 32 is a display device such as an LCD for displaying various types of information.

The communication portion 33 is a communication device for communicating, with an external device, indirectly via the network 11 such as a LAN or the internet, or directly by wired or wireless communication that is not performed via the network 11.

The storage portion 34 is a non-volatile storage device such as a semiconductor memory or an HDD (hard disk drive) for storing various types of information. The control portion 35 is a device for integrally controlling the print job transmitting apparatus 30.

The storage portion 34 is stored with an OS (Operating System) 34a and an application program 34b that runs in the OS 34a. The storage portion 34 may be stored with one or more other application programs that run in the OS 34a besides the application program 34b.

The storage portion 34 is stored with a printer driver 34c for the image forming apparatus 20 of the print system 10, and a print job transmission program 34d for transmitting the print job that is generated by the printer driver 34c.

The multiple programs including the OS 34a, the application program 34b, the printer driver 34c, and the print job transmission program 34d are, for example, installed to the print job transmitting apparatus 30 during manufacturing of the print job transmitting apparatus 30. In addition, the multiple programs may be installed additionally to the print job transmitting apparatus 30 from an external storage medium such as a CD (compact disk), a DVD (digital versatile disk), or a USB (universal serial bus) memory. In addition, the multiple programs may be installed additionally to the print job transmitting apparatus 30 from another apparatus in the network 11.

The storage portion 34 can be stored with transmission destination setting information 34e indicating setting content of the transmission destination of the print job.

The control portion 35, for example, includes a second CPU, a second ROM, and a second RAM. The second ROM stores a program and various types of data. The second RAM is a memory used as a work area for the second CPU. The second CPU executes the program that is stored in the storage portion 34 or the second ROM.

The control portion 35 functions as a transmission destination confirming portion 35a and a job transmission portion 35b by executing the print job transmission program 34d. The transmission destination confirming portion 35a is for confirming the transmission destination of the print job. The job transmission portion 35b is for transmitting the print job to the transmission destination that has been confirmed by the transmission destination confirming portion 35a.

Figure 4:
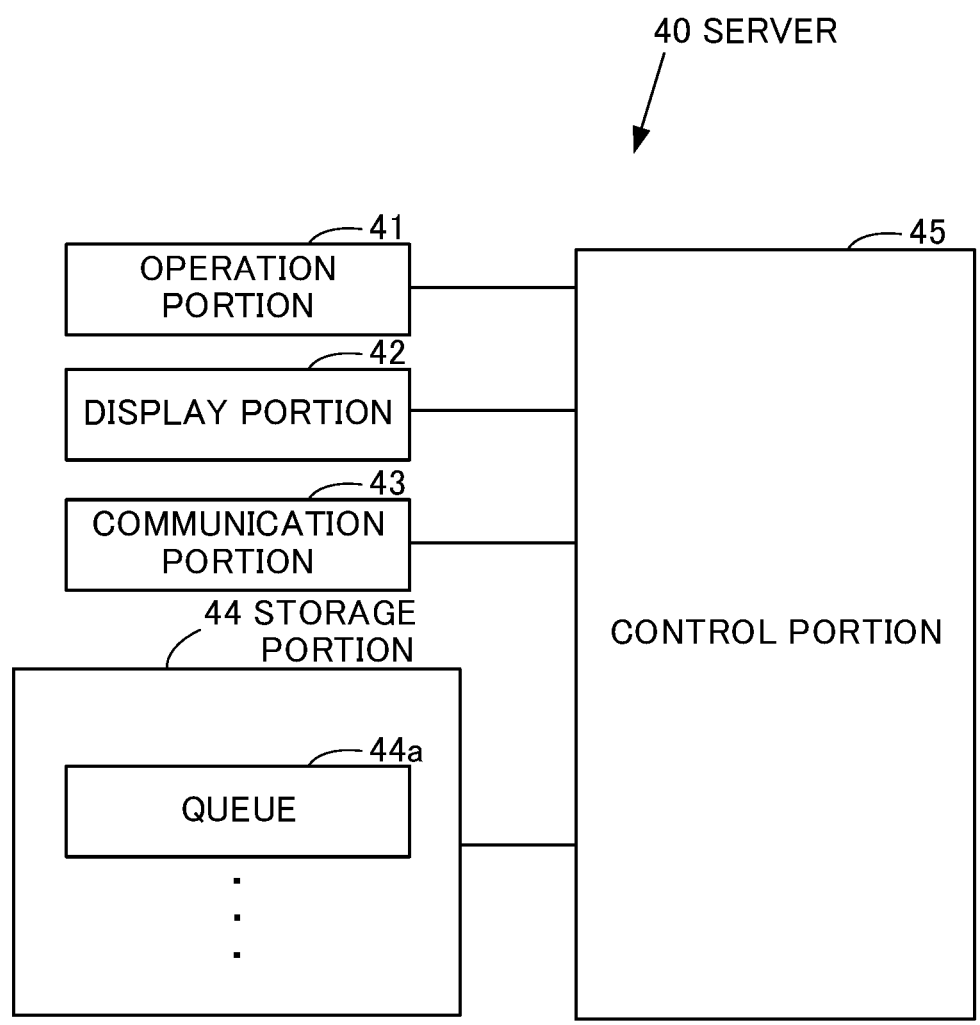
FIG. 4 is a block diagram of a server, in a case where the server shown in FIG. 1 is configured by one computer.

FIG. 4 is a block diagram showing a case where the server 40 is configured by one computer.

The server 40 shown in FIG. 4 includes an operation portion 41, a display portion 42, a communication portion 43, a storage portion 44, and a control portion 45. The operation portion 41 is an operation device such as a keyboard or a mouse for inputting various types of information. The display portion 42 is a display device such as an LCD for displaying various types of information.

The communication portion 43 is a communication device for communicating, with an external device, indirectly via the network 11 such as a LAN or the internet, or directly by wired or wireless communication that is not performed via the network 11.

The storage portion 44 is a non-volatile storage device such as a semiconductor memory or an HDD (hard disk drive) for storing various types of information. The control portion 45 is a device for integrally controlling the server 40.

The storage portion 44 is stored with at least one queue 44a for spooling the print job. The queue 44a of the storage portion 44 is set with the image forming apparatus 20 capable of obtaining the spooled print job, and a user capable of obtaining the spooled print job.

The control portion 45, for example, includes a third CPU, a third ROM, and a third RAM. The third ROM stores a program and various types of data. The third RAM is a memory used as a work area for the third CPU. The third CPU executes the program that is stored in the storage portion 44 or the third ROM.

Next, an operation performed by the print system 10 is described.

First, a description is given of an operation performed by the print job transmitting apparatus 30 when the print job transmitting apparatus 30 sets the transmission destination of the print job.

Figure 5:
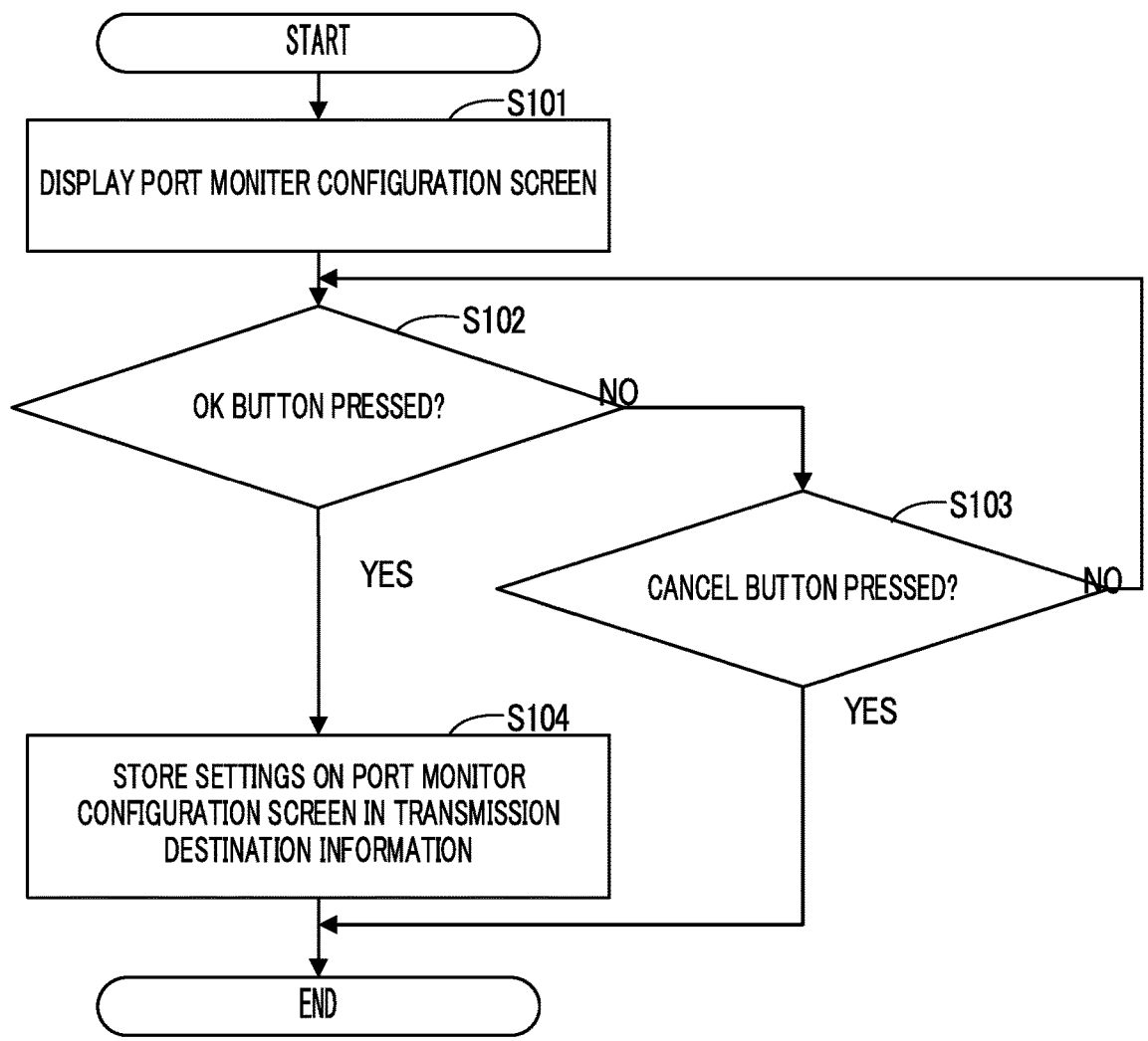
FIG. 5 is a flowchart showing an example procedure of an operation performed by the print job transmitting apparatus when the print job transmitting apparatus shown in FIG. 3 sets the transmission destination of the print job.

FIG. 5 is a flowchart showing an example procedure of the operation performed by the print job transmitting apparatus 30 when the print job transmitting apparatus 30 sets the transmission destination of the print job.

In a case where, for example, a setting screen for a device driver is displayed on the display portion 32, when an operation commanding for the setting of the transmission destination of the print job to start is performed on the operation portion 31, the transmission destination confirming portion 35a of the print job transmitting apparatus 30 executes the operation shown in FIG. 5.

Figure 6:
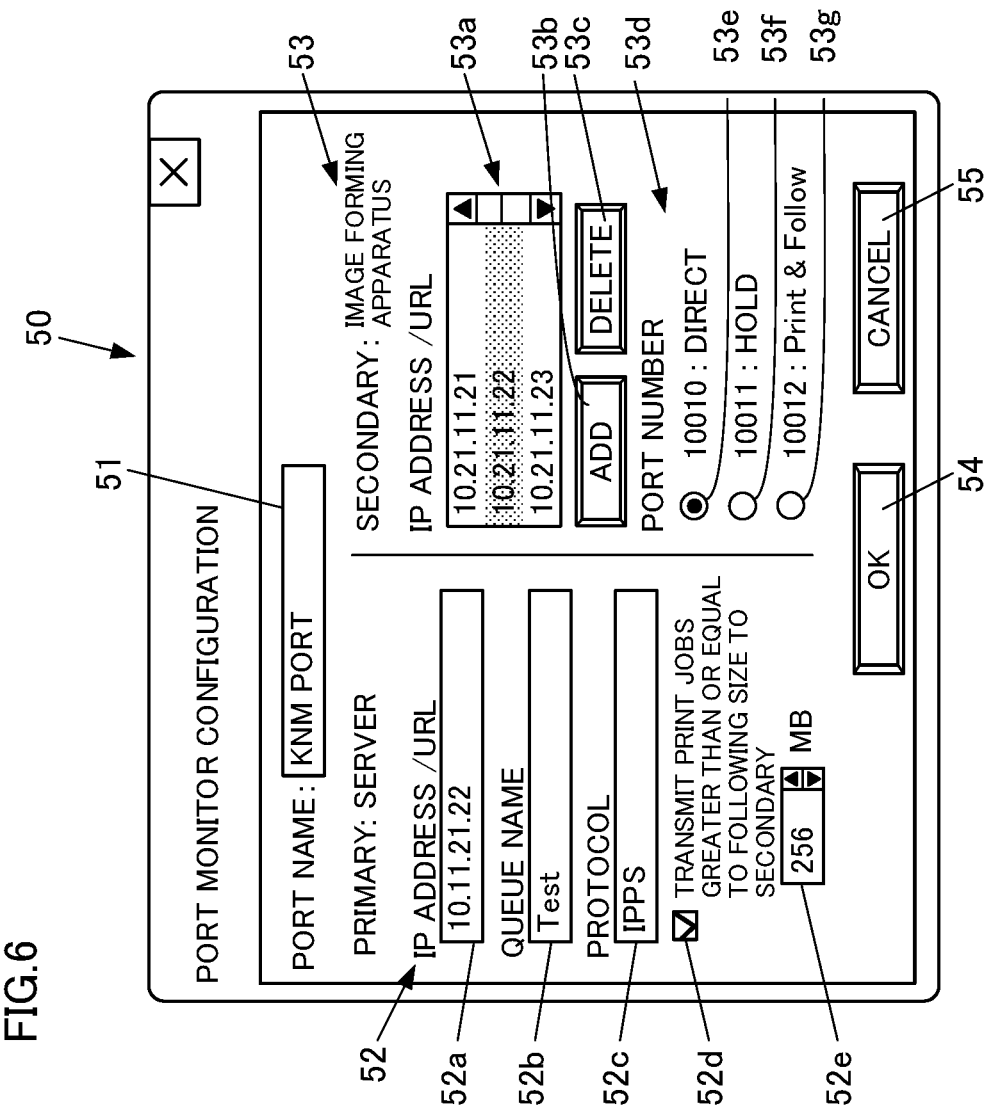
FIG. 6 is a diagram showing an example of a port monitor configuration screen that is displayed on the display portion shown in FIG. 3.

As shown in FIG. 5, the transmission destination confirming portion 35a displays, on the display portion 32, a port monitor configuration screen 50 for setting the transmission destination of the print job (step S101) (see FIG. 6).

FIG. 6 shows an example of the port monitor configuration screen 50 that is displayed on the display portion 32.

The port monitor configuration screen 50 shown in FIG. 6 includes a first text box 51, a primary setting field 52, a secondary setting field 53, an OK button 54, and a cancel button 55. The first text box 51 is an input field for setting a port name indicating the transmission destination of the print job. The primary setting field 52 is an input field for setting various types of information relating to the server 40 that has been set as a primary, wherein the primary is the transmission destination having highest priority. The secondary setting field 53 is an input field for setting various types of information relating to the image forming apparatus 20 that has been set as a secondary, wherein the secondary is the transmission destination having a priority lower than that of the primary.

The primary setting field 52 includes a second text box 52a, a third text box 52b, a fourth text box 52c, a check box 52d, and a spin box 52e.

The second text box 52a is an input field for setting an IP (Internet Protocol) address or a URL (Uniform Resource Locator) for the server 40. The third text box 52b is an input field for designating the abovementioned queue for the server 40.

The fourth text box 52c is an input field for designating a protocol that is used for communication with the server 40 when the print job is being transmitted thereto. The check box 52d is an input field for setting whether or not to, when the print job has a size that is greater than or equal to a specific size, transmit the print job to the image forming apparatus 20 that is the secondary, instead of the server 40 that is the primary.

Hereinafter, the specific size of the print job is referred to as a secondary transmission size. In addition, a setting of designating transmission, to the image forming apparatus 20 that is the secondary instead of the server 40 that is the primary, of the print job having a size that is greater than or equal to the secondary transmission size is referred to as a secondary transmission designation. The spin box 52e is an input field for setting the secondary transmission size.

The secondary setting field 53 includes a list box 53a, an addition button 53b, a deletion button 53c, and a radio button group 53d. The list box 53a is a field for displaying a list of IP addresses or URLs of the image forming apparatus 20 that has been set as the secondary.

The addition button 53b is an operation icon for displaying a screen for adding, to the list box 53a, an IP address or URL of the image forming apparatus 20. The deletion button 53c is an operation icon for deleting, from the list box 53a, an IP address or URL of the image forming apparatus 20.

The radio button group 53d includes multiple operation icons for designating a port number for the image forming apparatus 20. The radio button group 53d includes a first radio button 53e, a second radio button 53f, and a third radio button 53g.

The first radio button 53e is an operation icon for designating the port number 10010 that corresponds to a "direct" mode in which the image forming apparatus 20 does not spool the print job and executes it immediately. The second radio button 53f is an operation icon for designating the port number 10011 that corresponds to a "hold" mode in which the image forming apparatus 20 spools the print job to the queue 27a, so that the image forming apparatus 20 can execute the print job in response to a user command. The third radio button 53g is an operation icon for designating the port number 10012 that corresponds to a "Print & Follow" mode in which the image forming apparatus 20 spools the print job to the queue 27a, so that that image forming apparatus 20 or another image forming apparatus 20 can execute the print job in response to a user command.

As shown in FIG. 5, after the processing in step S101, the transmission destination confirming portion 35a determines whether or not the OK button 54 has been pushed (step S102).

When the transmission destination confirming portion 35a determines in step S102 that the OK button 54 has not been pressed, the transmission destination confirming portion 35a determines whether or not the cancel button 55 has been pressed (step S103).

When the transmission destination confirming portion 35a determines in step S103 that the cancel button 55 has been pressed, the transmission destination confirming portion 35a ends the operation shown in FIG. 5.

When the transmission destination confirming portion 35a determines in step S103 that the cancel button 55 has not been pressed, the transmission destination confirming portion 35a executes the processing in step S102.

When the transmission destination confirming portion 35a determines in step S102 that the OK button 54 has been pressed, the transmission destination confirming portion 35a stores, in the transmission destination setting information 34e, the various settings on the port monitor configuration screen 50 at the time when the OK button 54 was pressed (step S104), and ends the operation shown in FIG. 5.

Next, a description is given of an operation performed by the print job transmitting apparatus 30 when the print job transmitting apparatus 30 transmits the print job.

Figure 7:
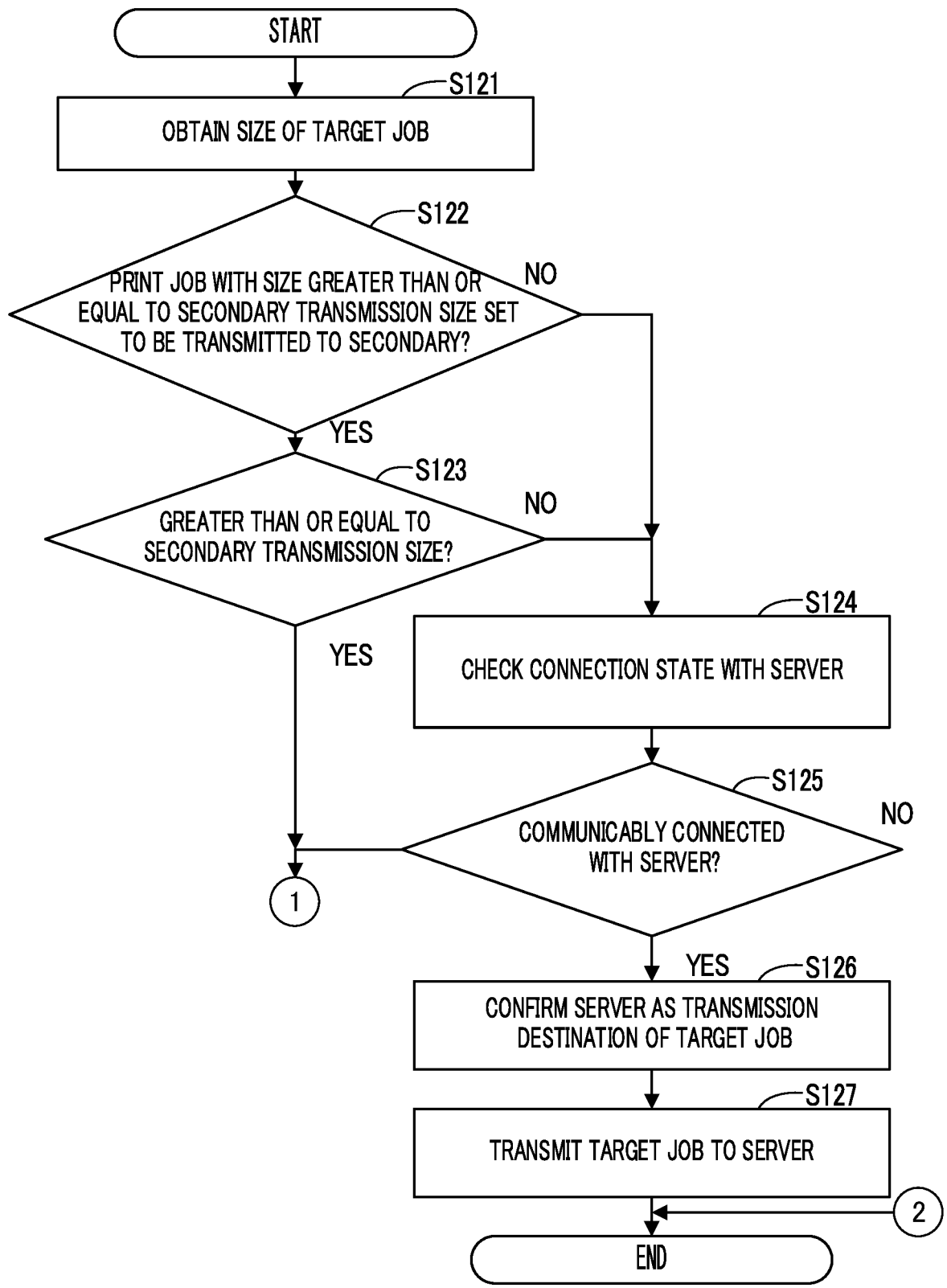
FIG. 7 is a flowchart showing part of an example procedure of an operation performed by the print job transmitting apparatus when the print job transmitting apparatus shown in FIG. 3 transmits the print job.
Figure 8:
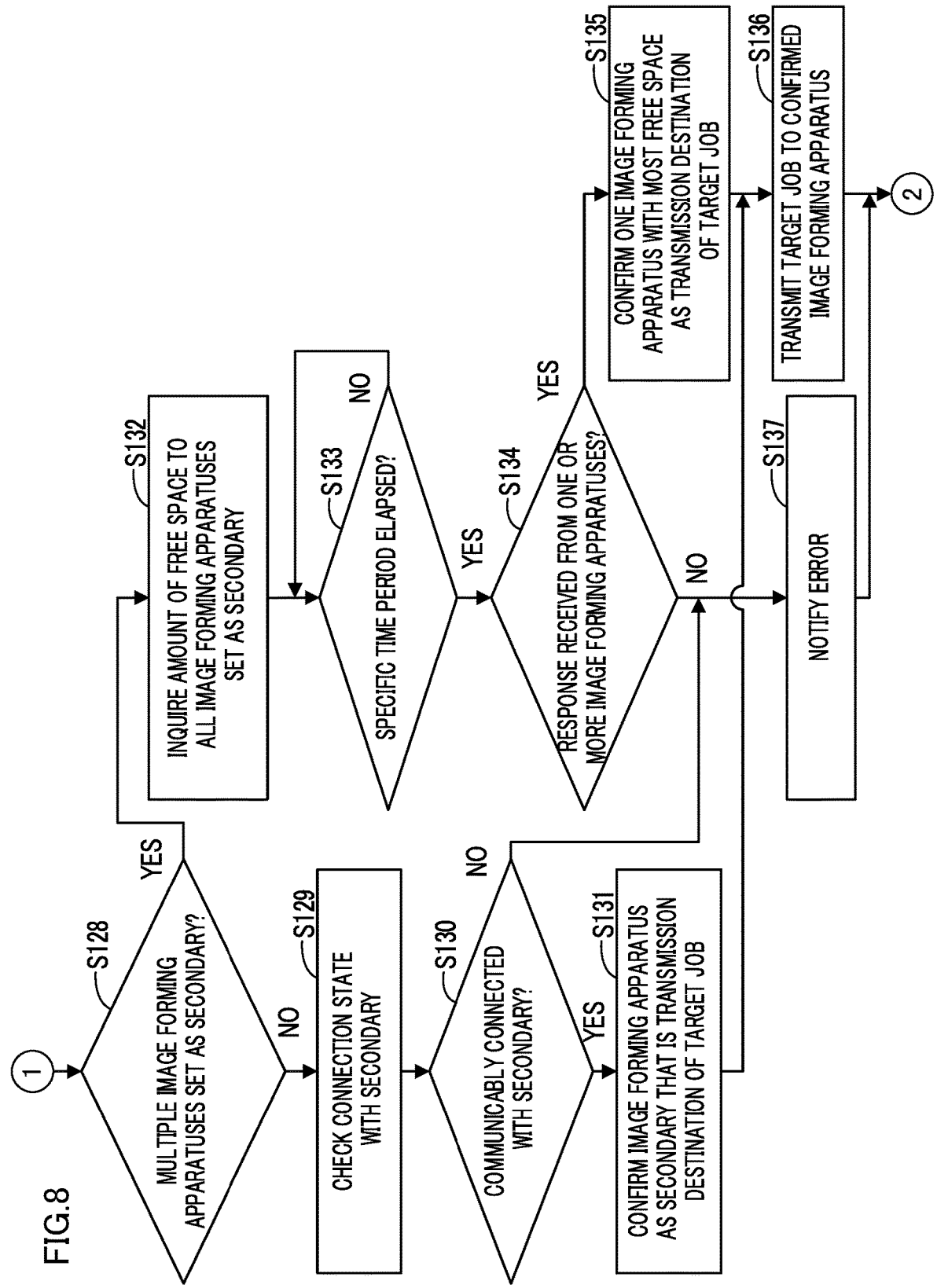
FIG. 8 is a flowchart showing the remaining part of the example procedure shown in FIG. 7.

FIG. 7 and FIG. 8 are flowcharts showing an example procedure of an operation performed by the print job transmitting apparatus 30 when the print job transmitting apparatus 30 transmits the print job.

The control portion 35 of the print job transmitting apparatus 30, in response to a command from an application program that is stored in the storage portion 34, generates the print job by executing the printer driver 34c. When the print job is generated by the execution of the printer driver 34c, the transmission destination confirming portion 35a executes the operation shown in FIG. 7 and FIG. 8.

As shown in FIG. 7 and FIG. 8, the transmission destination confirming portion 35a obtains the size of the print job that has been generated by the execution of the printer driver 34c (step S121). Hereinafter, the print job generated by the execution of the printer driver 34c is referred to as a target job.

After the processing in step S121, the transmission destination confirming portion 35a determines whether or not the secondary transmission designation has been set in the transmission destination setting information 34e (step S122).

When the transmission destination confirming portion 35a determines in step S122 that the secondary transmission designation has been set in the transmission destination setting information 34e, the transmission destination confirming portion 35a determines whether or not the size obtained in step S121 is greater than or equal to the secondary transmission size (step S123).

When the transmission destination confirming portion 35a determines in step S122 that the secondary transmission designation has not been set in the transmission destination setting information 34e, or determines in step S123 that the size obtained in step S121 is not greater than or equal to the secondary transmission size, the transmission destination confirming portion 35a checks the connection state of the server 40 that has been set as the primary in the transmission destination setting information 34e (step S124). For example, the transmission destination confirming portion 35a may adopt ping as a method to check the connection state.

After the processing in step S124, the transmission destination confirming portion 35a determines, based on the results of the checking in step S124, whether or not it is communicably connected with the server 40 (step S125).

When the transmission destination confirming portion 35a determines in step S125 that it is communicably connected with the server 40, the transmission destination confirming portion 35a confirms the server 40 as the transmission destination for the target job (step S126).

After the processing in step S126, the job transmission portion 35b transmits, to the server 40 that has been confirmed in step S126 as the transmission destination, the target job, the name of the user logged into the print job transmitting apparatus 30, and the name of the queue that has been designated in the transmission destination setting information 34e (step S127). Then, the job transmission portion 35b ends the operation shown in FIG. 7 and FIG. 8.

Accordingly, the server 40 spools, to the queue 44a indicated by the queue name that was transmitted from the print job transmitting apparatus 30 in step S127, the print job that was transmitted in step S127, in association with the user name that was transmitted in step S127.

It is noted that, when a command operation corresponding to the user name associated with the print job is performed on the operation portion 21 of the image forming apparatus 20 set in the queue 44a, the print job spooled to the queue 44a of the server 40 is obtained by the image forming apparatus 20 set in the queue 44a. Furthermore, the print job is executed by the image forming apparatus 20 that obtained the print job.

When the transmission destination confirming portion 35a determines in step S123 that the size obtained in step S121 is greater than or equal to the secondary transmission size, or determines in step S125 that it is not communicably connected with the server 40, the transmission destination confirming portion 35a determines whether or not more than one image forming apparatus 20 has been set in the transmission destination setting information 34e as the secondary (step S128).

When the transmission destination confirming portion 35a determines in step S128 that more than one image forming apparatus 20 has not been set as the secondary, similarly to the processing in step S124, the transmission destination confirming portion 35a checks the connection state of the server 40 that has been set as the secondary in the transmission destination setting information 34e (step S129).

After the processing in step S129, the transmission destination confirming portion 35a determines, based on the results of the checking in step S129, whether or not it is communicably connected with the image forming apparatus 20 that has been set as the secondary in the transmission destination setting information 34e (step S130).

When the transmission destination confirming portion 35a determines in step S130 that it is communicably connected with the image forming apparatus 20 that has been set as the secondary in the transmission destination setting information 34e, the transmission destination confirming portion 35a confirms, as the transmission destination of the target job, the image forming apparatus 20 that has been set as the secondary in the transmission destination setting information 34e (step S131).

When the transmission destination confirming portion 35a determines in step S128 that more than one image forming apparatus 20 has been set as the secondary, the transmission destination confirming portion 35a inquires, to each of the image forming apparatuses 20 that has been set as the secondary in the transmission destination setting information 34e, the amount of free space in the storage portion 27 of the image forming apparatus 20 (step S132).

After the processing in step S132, the transmission destination confirming portion 35a determines whether or not a specific time period has elapsed from the inquiry in step S132, until it determines that the specific time period has elapsed (step S133).

When the transmission destination confirming portion 35a determines in step S133 that the specific time period has elapsed from the inquiry in step S132, the transmission destination confirming portion 35a determines whether or not a response has been received from one or more image forming apparatuses 20, among the image forming apparatuses 20 to which the inquiries were made in step S132 (step S134).

When the transmission destination confirming portion 35a determines in step S134 that a response has been received from one or more image forming apparatuses 20, the transmission destination confirming portion 35a confirms, as the transmission destination of the target job, the image forming apparatus 20 that responded to the inquiry in step S132 with the largest size, among the one or more image forming apparatuses 20 that were determined in step S134 to have responded (step S135).

After the processing in step S131 or step S135, the job transmission portion 35b transmits, to the port number of the transmission destination confirmed in step S131 or step S135 that is designated in the transmission destination setting information 34e, the target job and the name of the user logged into the print job transmitting apparatus 30 (step S136).

The image forming apparatus 20 that has been confirmed as the transmission destination in step S131 or step S135 executes the following process in response to the port number designated in the transmission destination setting information 34e.

That is, when the designated port number is 10010, the image forming apparatus 20 does not spool the print job transmitted in S136 and executes it immediately. In addition, when the designated port number is 10011, the image forming apparatus 20 associates the print job transmitted in S136 with the user name transmitted in S136, and spools the print job in the "hold" mode to the queue 27a.

In addition, when the designated port number is 10012, the image forming apparatus 20 associates the print job transmitted in step S136 with the user name transmitted in step S136, and spools the print job to the queue 27a in the "Print & Follow" mode.

It is noted that the print job spooled to the queue 27a in the "hold" mode is executed, by the image forming apparatus 20 that has spooled the print job, when a print command operation, corresponding to the user name with which the print job has been associated, is performed on the operation portion 21 of the image forming apparatus 20 that has spooled the print job.

In addition, the print job spooled to the queue 27a in the "Print & Follow" mode is executed according to the following first embodiment or second embodiment.

According to the first embodiment, the print job is executed, by the image forming apparatus 20 that has spooled the print job, when a print command operation, corresponding to the user name with which the print job has been associated, is performed on the operation portion 21 of the image forming apparatus 20 that has spooled the print job.

According to the second embodiment, when a print command operation, corresponding to the user name with which the print job has been associated, is performed on the operation portion 21 of another image forming apparatus 20 that is different from the image forming apparatus 20 that has spooled the print job, the other image forming apparatus 20 obtains then executes the print job.

When the transmission destination confirming portion 35a determines in step S130 that it is not communicably connected with the image forming apparatus 20 that has been set as the secondary in the transmission destination setting information 34e, or determines in step S134 that no response has been received from any image forming apparatus 20, the transmission destination confirming portion 35a notifies, via the display portion 32, an error of being unable to transmit the print job (step S137).

After the processing in step S136 or step S137, the transmission destination confirming portion 35a ends the operation shown in FIG. 7 and FIG. 8.

As described above, the print job transmitting apparatus 30 transmits the print job to the image forming apparatus 20 (step S136) when the print job transmitting apparatus 30 is not communicably connected with the server 40 (No in step S125), and is communicably connected with the image forming apparatus 20 (Yes in step S130 or Yes in step S134). This allows the print job transmitting apparatus 30 to transmit the print job even when it is not communicably connected with the server 40.

In the case where the print job transmitting apparatus 30 transmits the print job to the server 40 (step S127), the volume of traffic in the network 11 for executing the print job in the image forming apparatus 20 includes the volume of traffic for transmitting the print job from the print job transmitting apparatus 30 to the server 40, and the volume of traffic for transmitting the print job from the server 40 to the image forming apparatus 20.

On the other hand, in the case where the print job transmitting apparatus 30 transmits the print job to the image forming apparatus 20, and the print job is executed by the image forming apparatus 20, the volume of traffic in the network 11 for executing the print job in the image forming apparatus 20 includes only the volume of traffic for transmitting the print job from the print job transmitting apparatus 30 to the image forming apparatus 20.

Even if the print job transmitting apparatus 30 is communicably connected with the server 40, when the size of the print job is greater than or equal to the specific size (Yes in step S123), the print job transmitting apparatus 30 transmits the print job to the image forming apparatus 20 (step S136). With this configuration, in the case where the print job is executed by the image forming apparatus 20, the volume of traffic in the network 11 until when the print job is executed by the image forming apparatus 20 is reduced, in comparison to the case where the print job is transmitted to the server 40.

Accordingly, the print job transmitting apparatus 30 is capable of reducing the volume of traffic in the network 11. With this configuration, in a case where the bandwidth of the network 11 is low, even if the size of the print job is large, it is possible to reduce the usage of the bandwidth of the network 11. As a result, it is possible to prevent delays in the network 11.

In the case where the designated port number in the transmission destination setting information 34e is 10011 or 10012, the print job transmitting apparatus 30 causes the image forming apparatus 20 that is the transmission destination to spool the print job transmitted to the image forming apparatus 20 in step S136.

the image forming apparatus 20 executes the spooled print job according to a command in both cases where the print job is transmitted to the primary (step S127) and where the print job is transmitted to the secondary (step S136). This improves the convenience of the image forming apparatus 20.

The image forming apparatus 20 is occasionally powered off to save energy. As a result, in the case where only one image forming apparatus 20 is set as the secondary (No in step S128), the image forming apparatus 20 that has been set as the secondary may be powered off (No in step S130). In this case, the print job transmitting apparatus 30 is not able to transmit the print job to the image forming apparatus 20 that has been set as the secondary.

However, when more than one image forming apparatus 20 has been set as the secondary (Yes in step S128), the print job transmitting apparatus 30 transmits the print job to one of multiple image forming apparatuses 20 that have each been set as the secondary (steps S135 and S136). This improves availability of the image forming apparatus 20.

When the multiple image forming apparatuses 20 have each been set as the secondary (Yes in step S128), the print job transmitting apparatus 30 executes the processing in steps S135 and S136. In steps S135 and S136, the print job transmitting apparatus 30 transmits the print job to the image forming apparatus 20 with the largest amount of free space in the storage portion 27 among the multiple image forming apparatuses 20. With this configuration, the load of the print jobs is divided among the multiple image forming apparatuses 20 that have each been set as the secondary.

It is noted that according to the present embodiment, among the multiple image forming apparatuses 20 that have each been set as the secondary, the image forming apparatus 20 that is the transmission destination to which the print job is to be sent is confirmed by the print job transmitting apparatus 30 in response to the amount of free space in the storage portion 27 of the image forming apparatus 20.

However, among the multiple image forming apparatuses 20 that have each been set as the secondary, the image forming apparatus 20 that is the transmission destination to which the print job is to be sent may be confirmed by the print job transmitting apparatus 30 based on an element other than the amount of free space in the storage portion 27 of the image forming apparatus 20.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A print system, comprising:
   a print job transmitting apparatus including a processor configured to execute:
   a transmission destination confirming portion to confirm a transmission destination of a print job; and
   a job transmission portion to transmit the print job to the transmission destination that has been confirmed by the transmission destination confirming portion;

an image forming apparatus configured to execute the print job; and a server configured to spool the print job to be executed by the image forming apparatus, wherein when the print job transmitting apparatus is communicably connected with the server, the transmission destination confirming portion prioritizes the server over the image forming apparatus and confirms the server as the transmission destination, when the print job transmitting apparatus is not communicably connected with the server and is communicably connected with the image forming apparatus, the transmission destination confirming portion confirms the image forming apparatus as the transmission destination, when an input to set a specific size of the print job is received prior to confirmation of the transmission destination, even in a case where the print job transmitting apparatus is communicably connected with the server, when a size of the print job is greater than or equal to the specific size, the transmission destination confirming portion confirms the image forming apparatus, instead of the server, as the transmission destination, when the job transmission portion transmits the print job to the image forming apparatus, the job transmission portion causes the image forming apparatus to spool the print job that is transmitted to the image forming apparatus, and the image forming apparatus spools the print job transmitted from the job transmission portion, when a print command operation corresponding to the print job spooled to the image forming apparatus is performed on an operation portion of the image forming apparatus, the image forming apparatus executes the print job corresponding to the print command operation, and when a print command operation corresponding to a print job spooled to another image forming apparatus is performed on the operation portion of the image forming apparatus, the image forming apparatus obtains the print job corresponding to the print command operation from the other image forming apparatus and executes the print job.

2. A print system, comprising:

a print job transmitting apparatus including a processor configured to execute:
  a transmission destination confirming portion to confirm a transmission destination of a print job; and
  a job transmission portion to transmit the print job to the transmission destination that has been confirmed by the transmission destination confirming portion;

an image forming apparatus configured to execute the print job; and a server configured to spool the print job to be executed by the image forming apparatus, wherein when the print job transmitting apparatus is communicably connected with the server, the transmission destination confirming portion prioritizes the server over the image forming apparatus and confirms the server as the transmission destination, when the print job transmitting apparatus is not communicably connected with the server and is communicably connected with the image forming apparatus, the transmission destination confirming portion confirms the image forming apparatus as the transmission destination, when an input to set a specific size of the print job is received prior to confirmation of the transmission destination, even in a case where the print job transmitting apparatus is communicably connected with the server, when a size of the print job is greater than or equal to the specific size, the transmission destination confirming portion confirms the image forming apparatus, instead of the server, as the transmission destination, the transmission destination confirming portion designates, to a transmission-destination apparatus that is the image forming apparatus set as the transmission destination, any one of:
  a first mode in which the transmission-destination apparatus does not spool the print job and executes the print job immediately;
  a second mode in which the transmission-destination apparatus spools and executes the print job; and
  a third mode in which the transmission-destination apparatus spools the print job, and the transmission-destination apparatus or another apparatus that is an image forming apparatus different from the transmission-destination apparatus executes the print job, and the image forming apparatus is configured to:
  when the first mode is designated, immediately execute the print job transmitted from the job transmission portion without spooling the print job;
  when the second mode is designated, spool the print job transmitted from the job transmission portion and when a print command operation corresponding to the print job spooled to the image forming apparatus is performed on an operation portion of the image forming apparatus, execute the print job corresponding to the print command operation; and
  when the third mode is designated, spool the print job transmitted from the job transmission portion in a manner such that:
    when the print command operation corresponding to the print job spooled to the image forming apparatus is performed on the operation portion of the image forming apparatus, the print job is executed corresponding to the print command operation, and
    when a print command operation corresponding to a print job spooled to another image forming apparatus is performed on the operation portion of the image forming apparatus, the print job is obtained corresponding to the print command operation from the other image forming apparatus and the print job is executed.

* * * * *